Jan. 23, 1940.                J. D. VILLAS                2,187,764
                             STEERING WHEEL
                          Filed Aug. 8, 1938           2 Sheets-Sheet 1
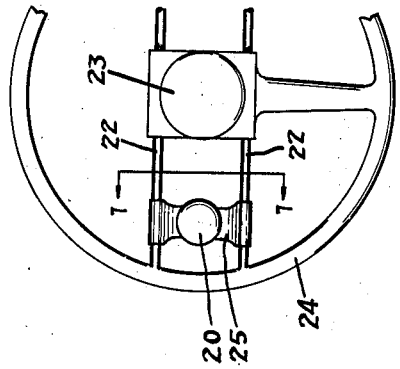
Fig. 6
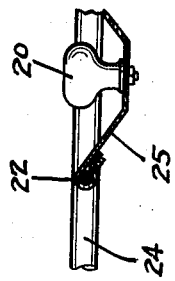
Fig. 7
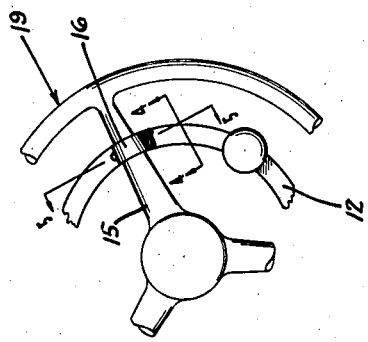
Fig. 3
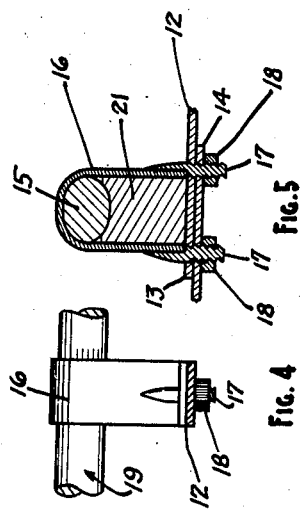
Fig. 5
Fig. 4
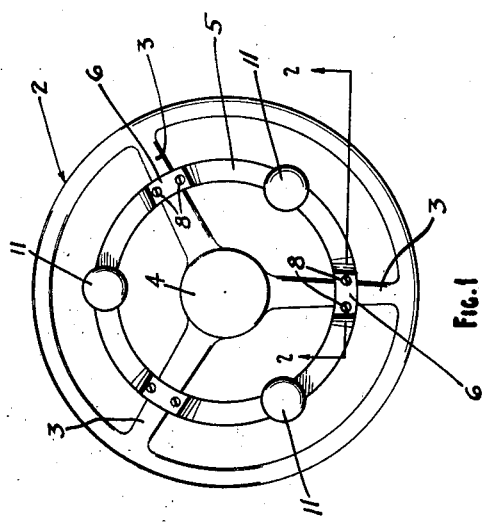
Fig. 1
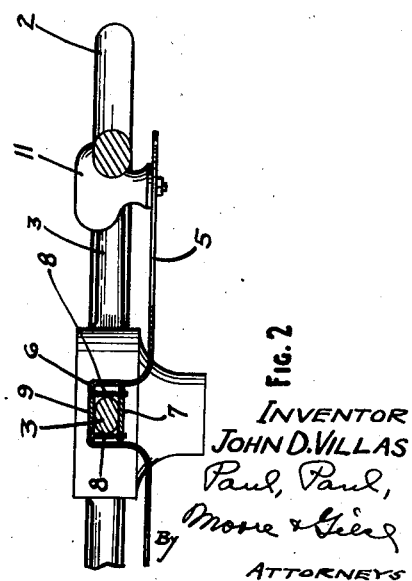
Fig. 2
INVENTOR
JOHN D. VILLAS
Paul, Paul,
Moore & Geerg
By
ATTORNEYS Jan. 23, 1940.   J. D. VILLAS   2,187,764
STEERING WHEEL
Filed Aug. 8, 1938   2 Sheets-Sheet 2
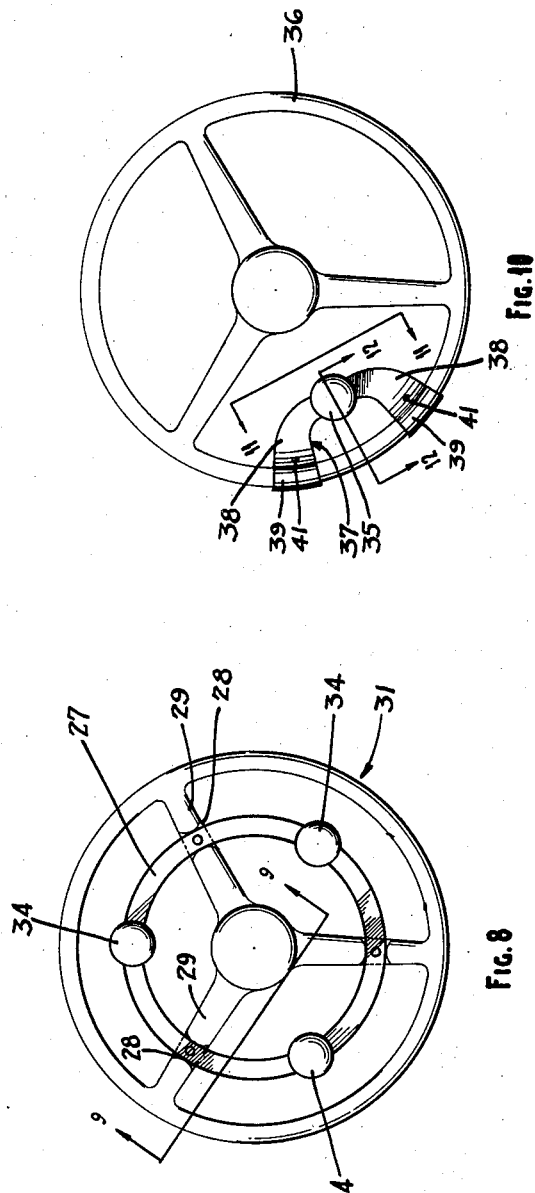
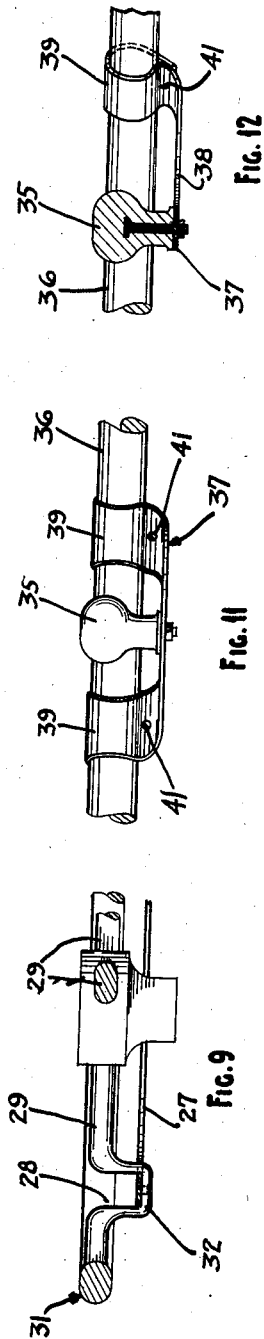
INVENTOR
JOHN D. VILLAS
ATTORNEYS Patented Jan. 23, 1940

2,187,764

UNITED STATES PATENT OFFICE 2,187,764

STEERING WHEEL

John D. Villas, Minneapolis, Minn.

Application August 8, 1938, Serial No. 223,655

2 Claims. (Cl. 74—557)

This invention relates to new and useful improvements in steering wheels and more particularly to an attachment for conventional steering wheels, whereby a plurality of hand knobs may readily be attached to a conventional steering wheel to facilitate rotating the same.

A further object is to provide an attachment for a steering wheel comprising an annulus having means for securing it to the wheel in a plane below the plane of the wheel rim, whereby the hand knobs secured to the annulus will not project above the wheel in a manner to interfere with the normal operation of the steering wheel.

A further object is to provide a knob attachment for automobile steering wheels, whereby a plurality of knobs may readily and conveniently be attached to the wheel at a location whereby they are not likely to interfere with the driver's sleeves, when rotating the wheel.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 1 is a plan view of a steering wheel showing my invention applied thereto;

Figure 2 is a detail sectional view on the line 2—2 of Figure 1, showing the preferred manner of securing the attachment of the wheel;

Figure 3 is a view showing an attachment of slightly modified construction;

Figure 4 is a detail sectional view on the line 4—4 of Figure 3;

Figure 5 is a detail sectional view on the line 5—5 of Figure 3;

Figure 6 is a view showing a wheel comprising spaced parallel rods which constitute the spokes of the wheel, and to which suitable knobs may be secured by novel brackets whereby the knobs will be disposed at an elevation whereby they are not likely to interfere with the driver's sleeves, when operating the wheel;

Figure 7 is an enlarged detail sectional view on the line 7—7 of Figure 6;

Figure 8 is a plan view of a form wherein the spokes of the steering wheel have depressions for receiving the annular member;

Figure 9 is a detail sectional view on the line 9—9 of Figure 8;

Figure 10 is another form showing a knob provided with means for securing it to the rim of the wheel;

Figure 11 is a detail sectional view on the line 11—11 of Figure 10; and

Figure 12 is a detail sectional view on the line 12—12 of Figure 10, showing how the knob may be attached to the rim of the wheel.

In the selected embodiment of the invention here shown, there is illustrated in Figure 1, a steering wheel comprising the usual rim 2 and spokes 3 secured at their inner ends to a central hub 4. In the form shown in Figure 1, the rim and spokes of the steering wheel are disposed in substantially the same plane, as is customary in most steering wheels.

A feature of the present invention resides in the means provided for supporting a plurality of knobs on the steering wheel, whereby said knobs will be disposed at an elevation whereby they may be conveniently operated to rotate the wheel without danger of the driver's sleeves or clothing becoming caught thereon, when he rotates the wheel.

The novel attachment herein disclosed, as illustrated in Figures 1 and 2, comprises an annulus 5, shown having a plurality of recesses 6 adapted to receive the spokes 3 of the steering wheel. To prevent the annulus 5 from becoming detached from the wheel 2, suitable clamping plates 7 may be engaged with suitable clamping screws 8, which clamping plates cooperate with the upper horizontal portions 9 of the recesses 6 to receive the spokes 3, as best shown in Figure 2.

A plurality of suitable knobs 11 are rotatably supported upon the annulus 5, and are preferably located between the usual spokes 3 of the steering wheel, as shown in Figure 1. The annulus 5, because of the recesses 6, is disposed in a plane located below the plane of the rim of the steering wheel, whereby the upper portions of the knobs 11 will project but slightly above the rim 2, as best illustrated in Figure 2. By this arrangement, the knobs may be conveniently operated to rotate the wheel, without interfering with the usual operation of the wheel, as will readily be understood.

Numerous attempts have heretofore been made to develop a knob attachment for a steering wheel but in all of these, the knob has been placed above the rim of the steering wheel, which is objectionable in that the knob often interferes with the driver's arm when rotating the wheel, which may cause serious accidents. By locating the knobs 11, as herein disclosed, this objection has been completely eliminated, and the operation of the wheel is greatly facilitated.

In Figures 3, 4, and 5, there is shown a form wherein an annulus 12 is used which is substantially flat. The ends 13 and 14 of the annulus are overlappingly arranged, as best shown in Figure 5, to facilitate mounting the annulus upon the wheel. By separating or spreading apart the ends 13 and 14 of the annulus 12, the latter may readily be slipped around the steering post, not shown in the drawings, after which it is moved into contact with the lower faces of the spokes 15 of the wheel and secured thereto by suitable clamps 16, having threaded studs 17 adapted to be received in suitable apertures provided in the annulus 12.

The clamp 16 provided at the joint between the ends of the annulus 12 has its studs 17 passing through alined apertures provided in said ends, so that when nuts 18 are secured to the studs 17, the ends of the annulus will be suitably secured together and, at the same time, the annulus will be fixedly secured to the spokes of the automobile wheel, indicated by the numeral 19. A suitable spacing block 21 is preferably interposed between the lower fact of each spoke 15 and the annulus 12, whereby the latter is secured to the steering wheel in spaced relation thereto, as will readily be understood. If desired, the attachment may readily be removed from the steering wheel by simply unscrewing the nuts 18 and removing the clamps 16.

In Figures 6 and 7, there is shown a form wherein the steering wheel is provided with spaced parallel rods 22 having their intermediate portions secured to the usual hub 23 of the wheel and their outer ends to the rim 24 of the steering wheel.

To facilitate turning or rotating the wheel, suitable hand knobs 20 are detachably secured to the rods 22 by suitable bridge members 25. Each bridge member 25 has a knob 20, the upper portion of which projects but slightly above the upper face of the steering wheel because of the offset made in the bridge member 25.

Figures 8 and 9 illustrate another construction comprising an annular member or annulus 27, shown made from a single piece of metal with its ends secured together to provide a solid ring. This annulus is shown supported in a plurality of recesses 28 provided in the spokes 29 of the wheel, generally indicated by the numeral 31. The annulus 27 is suitably secured to the bottom walls 32 of the recesses by such means as bolts or rivets. A plurality of knobs 34 are rotatably secured to the annulus 27 and provide means whereby the driver may readily rotate or spin the wheel with one hand. The recesses 28 are of a depth corresponding substantially to the recesses formed in the annulus 5, shown in Figures 1 and 2, whereby the knobs 34 will be depressed with reference to the rim of the wheel 31.

Figures 10, 11, and 12 illustrate another form wherein a single knob 35 is detachably secured to the wheel 36 by a single bracket, generally indicated by the numeral 37. The bracket is shown provided with spaced arms 38 having looped portions 39 adapted to embrace the rim of the wheel 36, as clearly illustrated in Figure 12. Suitable screws or other clamping means 41 are provided for securing the bracket 37 to the rim in fixed relation. The bracket, as will be noted by reference to Figures 11 and 12, is so arranged that the knob 35 is depressed with reference to the rim of the wheel, so as to avoid interference with the driver's sleeve or clothing, when the wheel is rotated by grasping only the rim of the wheel.

The novel attachment herein disclosed has been found very practical in combination with a conventional automobile steering wheel. By its use, the wheel may readily and conveniently be rotated or spun in either direction with one hand, if the car is at all in motion. This greatly facilitates handling the car, particularly when moving into and out of parking spaces. It has also been found extremely useful, when making right or left hand turns at intersections, because, by its use, the driver may signal his intention to turn by extending one arm from the car window in the usual manner, while guiding the car with his other hand, it being understood that because the driver may manipulate the steering wheel with one hand he may retain his other arm in extended position until he has completed the turn. The invention is extremely simple and inexpensive and the forms illustrated in Figures 1 to 7 may readily be attached to conventional steering wheels without, in any way, altering said wheels.

In Figures 1 to 5 and 8, I have shown the attachment as comprising an annular member having three knobs mounted thereon, whereby the knobs are interposed between the spokes of the wheel, as shown in Figure 8. Obviously, if the device is to be used in connection with a steering wheel having two or four spokes, the annular member may be provided with two or four knobs, as desired. By arranging the annular member, as shown in Figure 1, the grip portions of the knobs 11 will be disposed substantially in the plane of the rim of the wheel, as best illustrated in Figure 2, whereby the danger of the driver's sleeve or clothing catching the knobs when the wheel is rotated, is entirely eliminated. It will be noted that in the constructions illustrated in the accompanying drawings, the knobs do not interfere with the normal operation of the wheel. In other words, if a driver prefers to use the wheel in a conventional manner, he may grasp the rim thereof without interference from the knobs. This is an important feature in that there are some drivers who prefer to use only the rim when operating a car under ordinary conditions, but who find the knobs very useful when maneuvering a car into and out of parking spaces, where it is sometimes necessary to rotate the wheel several revolutions to guide the car in its course into and out of such places, or when attempting to make a turn at an intersection.

I claim as my invention:

1. An attachment for a steering wheel, comprising a bracket having outwardly directed, spaced arms, means at the ends of said arms for securing them to the wheel rim, said means being disposed above the plane of the bracket whereby thee bracket is spaced downwardly from the plane of the rim, and a knob rotatably mounted on the bracket and spaced inwardly from the wheel rim to provide adequate room for an operator's hand, when grasping the knob.

2. An attachment for a steering wheel, comprising a bracket having spaced arms, clamping means at the ends of said arms for securing the bracket to the wheel rim, a knob rotatably supported on the intermediate portion of the bracket and spaced inwardly from the wheel rim to provide adequate room between the rim and knob to permit an operator to readily grasp the knob, and the intermediate portion of the bracket being disposed in a plane below the plane of the rim, whereby the top of the knob is spaced but slightly above the top of the rim, whereby the knob is not likely to interfere with the operator's arm, when operating the wheel.

JOHN D. VILLAS.